United States Patent [19]
Kim

[11] Patent Number: 5,926,243
[45] Date of Patent: Jul. 20, 1999

[54] LIQUID CRYSTAL DISPLAY

[75] Inventor: Tae-seung Kim, Kyungsangnam-do, Rep. of Korea

[73] Assignee: Samsung Display Devices Co., Ltd., Kyungki-do, Rep. of Korea

[21] Appl. No.: 09/123,499

[22] Filed: Jul. 28, 1998

[30] Foreign Application Priority Data

Jul. 31, 1997 [KR] Rep. of Korea ................ 97-20727

[51] Int. Cl.⁶ .................................................. G02F 1/1333
[52] U.S. Cl. ...................... 349/138; 349/58; 349/84; 349/161
[58] Field of Search .................... 349/138, 52, 58, 349/59, 122, 161, 16, 84, 153

[56] References Cited

U.S. PATENT DOCUMENTS

| | | |
|---|---|---|
| 4,957,349 | 9/1990 | Clerc et al. .......................... 349/106 |
| 5,208,080 | 5/1993 | Gajewski et al. ..................... 349/16 |
| 5,515,188 | 5/1996 | MIles et al. ......................... 349/84 |

*Primary Examiner*—William L. Sikes
*Assistant Examiner*—Dung Nguyen
*Attorney, Agent, or Firm*—Christie, Parker & Hale, LLP

[57] ABSTRACT

A liquid crystal display includes two substrates spaced apart from each other a predetermined distance, conductive layers formed on inner surfaces of the substrates and facing each other, a liquid crystal injected between the conductive layers, sealants for bonding the substrates together, a thermal insulation layer externally enclosing the substrates and the sealants, and polarizer films each formed on external sides of the substrates with the thermal insulation layer interposed therebetween.

4 Claims, 1 Drawing Sheet

LIQUID CRYSTAL DISPLAY

CROSS REFERENCE TO RELATED APPLICATION

This application is based on application No. 97-20727 filed in Korean Industrial Property Office on Jul. 31, 1997, which is incorporated herein by reference,

BACKGROUND OF THE INVENTION (a) Field of the Invention

The present invention relates to a liquid crystal display and, more particularly, to a liquid crystal display which achieves stable operation by thermally isolating the liquid crystal from the external environment.

(b) Description of the Related Art

Generally, liquid crystal displays experience a common characteristic wherein the alignment directions of the liquid crystal molecules can be changed in accordance with a change in an applied electric field. This characteristic gives the liquid crystals the ability to control light in a specific way and makes them suitable for use in display devices.

With advances in micro-electronics technology which have made portable systems feasible, tho liquid crystal display has been highlighted as a thin and light low-powered display device.

FIG. 2 is a cross-sectional view showing the structure of a conventional liquid crystal display. The liquid crystal display 15 includes upper and lower substrates 1 and 3 spaced apart a predetermined distance, conductive layers 5a and 5b coated on inner surfaces of the upper and lower substrates 1 and 3, respectively, and facing each other, a liquid crystal 7 injected between the conductive layers 5a and 5b, sealants 9 for bonding the upper and lower substrates 1 and 3, together, and upper and lower polarizer films 11 and 13 each attached on outer surfaces of the upper and lower substrate 1 and 3, respectively.

The upper and lower substrates 1 and 3 are formed with transparent glass materials and spaced apart from each other to thereby form a gap between them. The liquid crystal 7 is injected into the gap through an injection inlet (not shown).

The conductive layers 5a and 5b are formed with indium tin oxide (ITO) materials and constitute horizontal and vertical electrode patterns. The cross-point of the horizontal and vertical electrode patterns becomes a pixel. In operation, the conductive layers 5a and 5b are applied with voltage from an external driving circuit (not shown).

Meanwhile, the upper and lower polarizer films 11 and 13 are adjusted perpendicular to each other in their polarization axes.

As the liquid crystal 7 is injected into the gap between the upper and lower substrates 1 and 3, it is twisted by 90° with respect to the substrates 1 and 3. Thus, when a voltage is applied to the conductive layers 5a and 5b, molecules of the liquid crystal 7 reorient themselves perpendicular to the substrates 1 and 3 to thereby control the transmittance of light passing through them. That is, the linearly polarized light that has passed through the upper polarizer film 11 is unable to pass through the lower polarizer film 13.

However, in the conventional liquid crystal display 15, the liquid crystal 7 is easily affected by external temperature changes and does not keep its liquid crystalline phase at relatively higher or lower temperatures. That is, the liquid crystal 7 retains much of its crystalline properties at relatively higher temperatures. Thus, the molecule alignment of the liquid crystal 7 is changed slowly under an applied voltage and, as a result, the response time becomes slower.

On the contrary, at relatively lower temperatures, the liquid crystal 7 retains much of its liquid properties. Therefore, the birefringence of the liquid crystal 7 bearing a refractive index in the long axis direction and a refractive index in the short axis direction cannot be uniformly kept. As a result, the desired molecule alignment of the liquid crystal 7 is not maintained resulting in a picture image with degraded contrast.

SUMMARY OF THE INVENTION

Accordingly, an embodiment of the present invention is directed to a liquid crystal display which substantially obviates one or more of the problems due to the limitations and disadvantages of the related art.

An object of an embodiment of the present invention is to provide a liquid crystal display which achieves stable operation by thermally isolating the liquid crystal from the external environment.

Additional features and advantages of embodiments of the invention will be set forth in the description which follows, and in part will be apparent from the description, or may be learned by practice of the invention. The objects and other advantages embodiments of the invention will be realized and attained by the structure particularly pointed out in the written description and claims hereof as well as the appended drawings.

To accomplish these and other advantages, a preferred embodiment of a liquid crystal display includes two substrates spaced apart from each other a predetermined distance, two conductive layers, one coated on each inner surface of the substrate and facing each other, a liquid crystal injected between the conductive layers, sealants for bonding the substrates together, a thermal insulation layer enclosing the substrates and the sealants, and the polarizer films, one each attached on each external side of the substrate with the thermal insulation layer interposed between them.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate a particular embodiment of the invention and, together with the description, serve to explain the principles of the invention. In the drawings.

Figure 1:
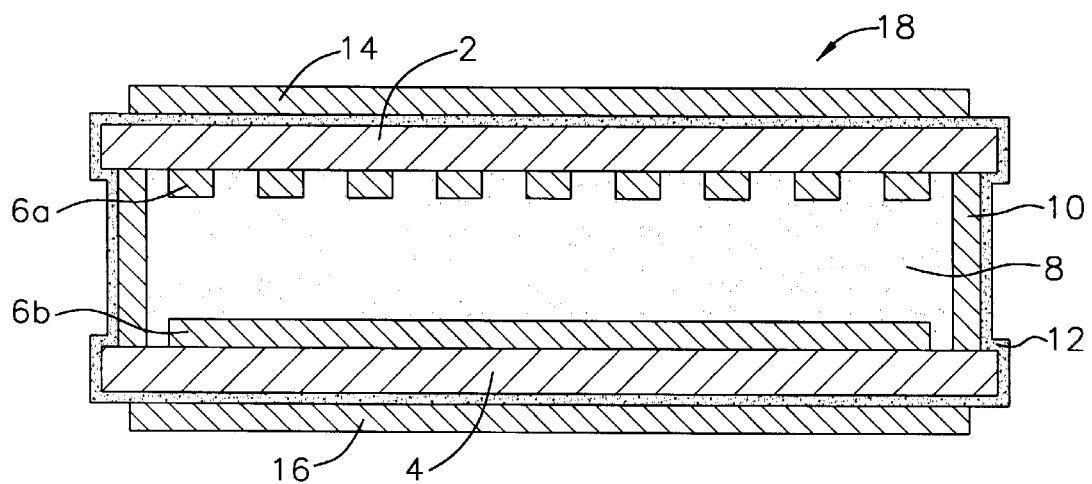
FIG. 1 is a cross-sectional view showing a liquid crystal display according to a preferred embodiment of the present invention.
Figure 2:
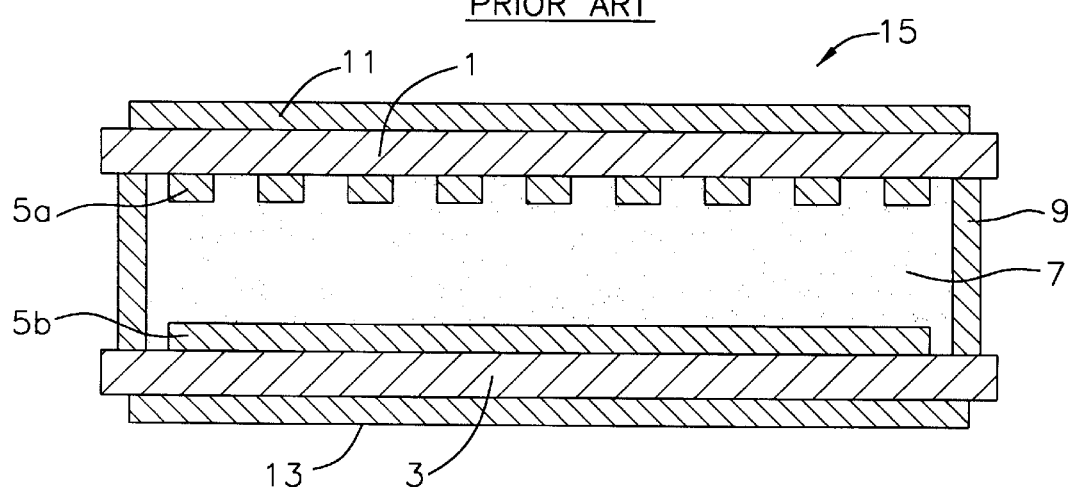
FIG. 2 is a cross-sectional view showing a liquid crystal display according to the prior art.

In the following detailed description, only the preferred embodiment of the invention has been shown and described, simply by way of illustration of the best mode contemplated by the inventor(s) of carrying out the invention. As will be realized, the invention is capable of modification in various other respects, all without departing from the invention. Accordingly, the drawing and description are to be regarded as illustrative in nature, and not as restrictive.

DETAILED DESCRIPTION OF THE INVENTION

Reference will now be made in detail to the preferred embodiments of the present invention, examples of which are illustrated in the accompanying drawings.

As shown in FIG. 1, the liquid crystal display 18 includes upper and lower substrates 2 and 4 spaced apart from each other a predetermined distance, conductive layers 6a and 6b each coated on inner surfaces of the upper and lower substrates 2 and 4, respectively, and facing each other, a liquid crystal 8 injected between the conductive layers 6a and 6b, sealants 10 for bonding the upper and lower substrates 2 and 4 together, a thermal insulation layer 12 enclosing the upper and lower substrates 2 and 4 and the sealants 10, and upper and lower polarizer films 14 and 15 each attached on the external side of the upper and lower substrates 2 and 4, respectively, with the thermal insulation layer 12 interposed therebetween.

The upper and lower substrates 2 and 4 are formed with transparent glass materials and spaced apart from each other to form a gap between them. The liquid crystal 8 is injected into the gap through an injection inlet (not shown).

The conductive layers 6a and 6b are formed with indium tin oxide (ITO) materials and constitute horizontal and vertical electrode patterns. The cross-point of the horizontal and vertical electrode patterns becomes a pixel. In operation, the conductive layers 6a and 6b are applied with voltage from an external driving circuit (not shown).

Meanwhile, the upper and lower polarizer films 14 and 16 are adjusted perpendicular to each other in their polarization axes.

As the liquid crystal 8 is injected into the gap between the upper and lower substrates 2 and 4, it is twisted by 90° with respect to the substrates 2 and 4. Thus, when a voltage is applied to the conductive layers 6a and 6b, molecules of the liquid crystal 8 reorient themselves perpendicular to the substrates 2 and 4 to thereby control the transmittance of light passing through them. That is, the linearly polarized light that has passed through the upper polarizer film 14 is unable to pass through the lower polarizer film 16.

Meanwhile, the thermal insulation layer 12 is provided to thermally isolate the liquid crystal 8 from the external environment, and thereby prevent the liquid crystalline phase of the liquid crystal 8 from being changed. The thermal insulation layer 12 is preferably formed with transparent tin oxide based materials with various additives.

The coating of the thermal insulation layer 12 can be performed in various ways including a spray method.

Therefore, the liquid crystalline phase of the liquid crystal 8 can be maintained constantly even in lower and higher external temperatures owing to the thermal insulation layer 12. And as a result, the deterioration in contrast and the retardation in response time can be prevented.

It will be apparent to those skilled in the art that various modifications and variations can be made in the liquid crystal display of the present invention without departing from the spirit or scope of the invention. Thus, it is intended that the present invention cover modifications and variations of this invention provided they come within the scope or the appended claims and their equivalents.

What is claimed is:

1. A liquid crystal display comprising:

two substrates spaced apart from each other with a predetermined distance;

conductive layers each formed on an inner surface of a respective one of the substrates and facing each other;

a liquid crystal injected between the conductive layers;

sealants for bonding the substrates together;

a thermal insulation layer externally enclosing the substrates and the sealants; and polarizer films each attached on an external side of a respective one of the substrates while interposing the thermal insulation layer therebetween.

2. The liquid crystal display of claim 1, wherein the thermal insulation film is formed with tin oxide based materials.

3. A liquid crystal display comprising:

two substrates spaced apart a predetermined distance from each other;

two conductive layers, one formed on each inner surface of the substrate and facing each other;

a liquid crystal injected between the conductive layers;

sealants for bonding the substrates together;

a thermal insulation layer enclosing the substrates and the sealants; and two polarizer films, one attached on each external side of the substrate with the thermal insulation layer interposed therebetween.

4. The liquid crystal display of claim 1 wherein the thermal insulation film comprises tin oxide based materials.

* * * * *